(12) United States Patent
Gilchrist et al.

(10) Patent No.: US 9,565,599 B1
(45) Date of Patent: Feb. 7, 2017

(54) ELECTRONIC DEVICES WITH DISTRIBUTED RADIOS

(71) Applicant: International Business Machines Corporation, Armonk, NY (US)

(72) Inventors: James P. Gilchrist, Poughkeepsie, NY (US); Michael E. Gildein, Wappinger Falls, NY (US); Rajaram B. Krishnamurthy, Wappingers Falls, NY (US); Daniel Rogers, San Leandro, CA (US); Moses J. Vaughan, Mahwah, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/919,365

(22) Filed: Oct. 21, 2015

Related U.S. Application Data

(63) Continuation of application No. 14/860,868, filed on Sep. 22, 2015.

(51) Int. Cl.
*H04M 1/00* (2006.01)
*H04W 36/00* (2009.01)
*H04W 24/02* (2009.01)

(52) U.S. Cl.
CPC ......... *H04W 36/0027* (2013.01); *H04W 24/02* (2013.01)

(58) Field of Classification Search
CPC .......................... H04W 36/0027; H04W 24/02
USPC ...................................................... 455/552.1
See application file for complete search history.

(56) References Cited

U.S. PATENT DOCUMENTS

| | | | | |
|---|---|---|---|---|
| 5,515,062 A | * | 5/1996 | Maine | G01S 5/0036 342/352 |
| 2004/0264403 A1 | * | 12/2004 | Fette | H04B 7/04 370/328 |
| 2005/0188087 A1 | * | 8/2005 | Iyoda | G06F 9/505 709/226 |
| 2012/0271950 A1 | * | 10/2012 | Yamaji | H04L 41/0896 709/226 |
| 2016/0051904 A1 | * | 2/2016 | Abir | A63H 33/042 446/484 |

OTHER PUBLICATIONS

James P. Gilchrist, et al., "Electronic Devices With Distributed Radios", U.S. Appl. No. 14/860,868, filed Sep. 22, 2015.
List of IBM Patents or Patent Applications Treated as Related; (Appendix P), filed Oct. 22, 2015, 2 pages.

* cited by examiner

*Primary Examiner* — Ajibola Akinyemi
(74) *Attorney, Agent, or Firm* — Cantor Colburn LLP; Steven Chiu

(57) ABSTRACT

A modular electronic device including a master core and a plurality of communication radio modules is provided. The modular electronic device maximizes communication performance by receiving a request for network operations from a mobile operating system of the modular electronic device; polling a table to determine a capacity of each communication radio module; and assigning the network operations to a module of the communication radio modules with a highest available capacity to maximize the communication performance of the modular electronic device.

6 Claims, 5 Drawing Sheets

ELECTRONIC DEVICES WITH DISTRIBUTED RADIOS

DOMESTIC PRIORITY

This application is a continuation of U.S. application Ser. No. 14/860,868, filed on Sep. 22, 2015, the disclosure of which is incorporated by reference herein in its entirety.

BACKGROUND

The present disclosure relates generally to electronic devices with distributed radios, and more specifically, to a puzzle-style modular electronic device that includes multiple communication radio modules that drive communication performance.

In general, cell phones can leave users frustrated when signal strength of a contemporary service provider is weak or data transfer rates to and from that contemporary service provider is slow. To combat the weak signal strength or the slow data transfer rates, contemporary service providers enable users to locally install a small, low-power cellular base station that connects to their cellular networks. However, locally installed base stations are limited to users on the same network and only resolve signal issues in a small geographic area.

Another mechanism contemporary service providers utilize for combatting weak signal strength or slow data transfer rates is channel bonding. Channel bonding is a bonding of network input/output to multiple available Ethernet ports on a computer. However, channel bonding generally relates to static hardware configurations of the computer and generally static network infrastructure, both of which are not found in the cell phone market. In turn, channel bonding does not provide the adaptability and mobility required by cell phones and contemporary service providers.

SUMMARY

Embodiments include a method, a system, and a computer program product with respect to a modular electronic device including a master core and a plurality of communication radio modules. The modular electronic device maximizes communication performance by receiving a request for network operations from a mobile operating system of the modular electronic device; polling a table to determine a capacity of each communication radio module; and assigning the network operations to a module of the communication radio modules with a highest available capacity to maximize the communication performance of the modular electronic device.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
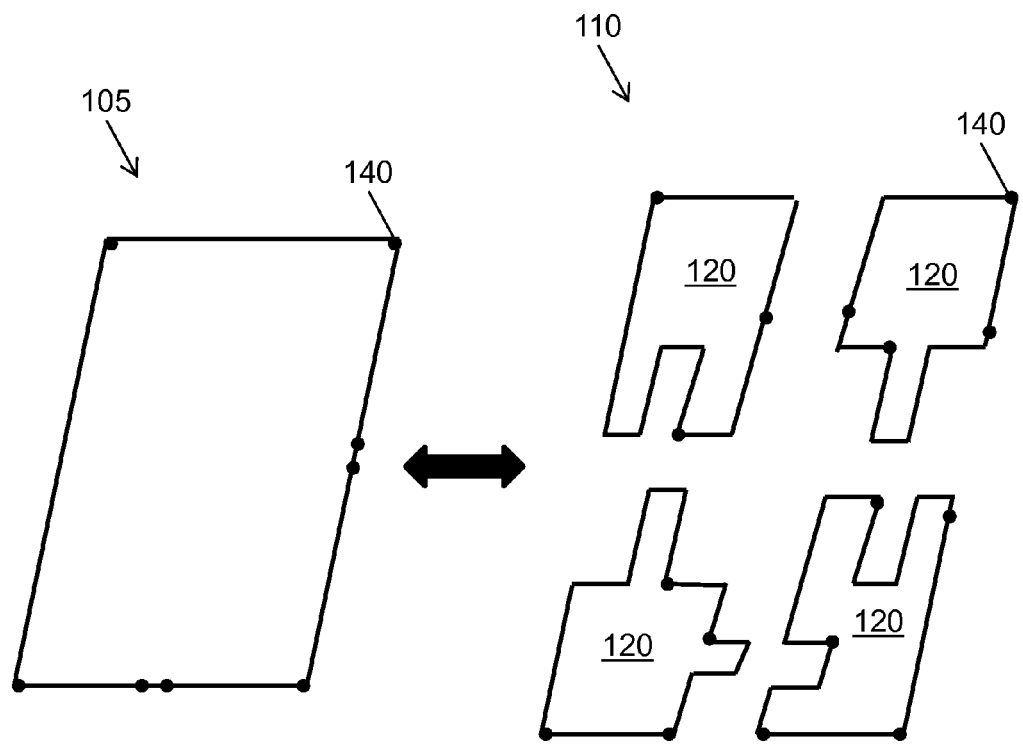
FIG. 1 depicts a puzzle-style modular electronic device according to an embodiment of the present invention.

Embodiments described herein relate to electronic devices with distributed radios, and more specifically, to a puzzle-style modular electronic device that includes multiple communication radio modules that drive communication performance.

In general, electronic devices with distributed radios bind together computational resources (specifically network input/output (I/O)) in a dynamically alterable hardware environment and present these computational resources as a unified virtual hardware layer to a mobile operation system. The electronic devices therefore include multiple hot-pluggable hardware devices (e.g., a plurality of block modules that can include communication radio modules) with different specializations and available resources. The block modules are configured to allow mobile operating systems and applications to use those resources as if the electronic devices possessed a static hardware configuration. The mobile operating systems and applications, in turn, are configured to interact with and manage a number of available block modules, resources provided by these block modules, or removing from or adding to a current set of block modules if resource availability is altered mid-task. Further, the block modules can be communicatively coupled to the electronic devices, while being physically separate, such that operability is when the block modules and electronic devices are in different locations. In this way, the electronic devices with distributed radios avoid channel bonding concepts and, instead, bind network I/O to multiple hardware ports to drive better communication performance.

For instance, the puzzle-style modular electronic devices include a three dimensional spatial layout of block modules. Further, the block modules can provide a combination of hardware and software components to monitor hardware network resource availability and dynamically distribute I/O across these components to maximize the throughput and reliability of network operations. That is, the block modules of the puzzle-style modular electronic devices can include a plurality of communication radio blocks that can be aggregated and/or congregated in such a way that renders better signal performance and higher communication functionality. A metric for quantifying signal performance and higher communication functionality is, but are not limited to, signal strength.

Signal strength, also know as signal level or field strength, can refer to a magnitude of an electric field at a reference point that is at a significant distance from a transmitting antenna (e.g., communication radio block). It may also be referred to as received. Signal strength can vary when a user is stationary and/or as the user is mobile. As a result, a signal strength associated with the communication radio blocks can change over time and the puzzle-style modular electronic devices can allocate communication transfers from applications to a highest performing radio dynamically.

For example, a puzzle-style smartphone (e.g., a puzzle-style modular electronic device) can include as block modules a plurality of communication radios. Each communication radio is software programmable component that includes a processor and a memory, along with I/O hardware to communicate with multiple service providers. The communication radios can allow the puzzle-style smartphone to connect to multiple service providers using different network standards, for example, high speed packet access+, worldwide interoperability for microwave access and long term evolution, as well as other wireless standards (e.g., Wi-Fi, Bluetooth, or ZigBee).

In operation, when the puzzle-style smartphone enters into a geographic area with low signal strength (e.g., 10%) to a service provider, the communication radios can individually leverage that low signal strength so in the aggregate the puzzle-style smartphone receives a higher communication performance. That is, if the puzzle-style smartphone includes three communication radios that can separately connect to a single service provider with 10% signal strength, an aggregate connection strength across the three communication radios can be three times the 10% signal strength (e.g., 30%). While in certain situations, the three radios will share the capacity corresponding to a signal strength of a location, three combined radios can have more network transactions in-flight to provide higher performance for the modular device. Further, three combined radios can be physically removed from the puzzle-style smartphone and placed in different locations (e.g., along windows of an automobile or a building to experience or maximize different signal strengths. This higher performance can be experienced when the signal strength changes or the user moves to a new zone where the signal strength is higher.

In another operation, when the puzzle-style smartphone enters into a geographic area with multiple services providers supplying various signal strength (e.g., a first provider has a 20% signal, a second provider has a 15% signal, and a third provider has a 30% signal), the communication radios can individually leverage a connection to each service provider so in the aggregate the puzzle-style smartphone receives a higher communication performance. That is, if the puzzle-style smartphone includes three communication radios that can separately connect to a Bluetooth hotspot of a first provider, a Wi-Fi network of a second provider, and a cellular network of a third provider, where (e.g., a Bluetooth has a 20% signal, the Wi-Fi network has a 15% signal, and a cellular network has a 30% signal), the aggregate connection capacity across the three communication radios can be leveraged for higher communication performance %). In both of the above operation, the puzzle-style smartphone can send data packets through different communication radios across different connection or networks using a common compute data structure so the data packets can assemble at a receiving device. In another embodiment, a first application could be configured to communicate using the communication radios associated with a service provider. In this case, subsequent applications can use the communication radios associated with other communication service providers. As a result, the complexity of fusing communication streams across multiple service providers can be avoided at the puzzle-style smartphone.

Turning now to FIG. 1, a puzzle-style modular electronic device 100 is depicted according to an embodiment of the present invention. These various components of the puzzle-style modular electronic device 100 work in harmony to form a logical device grouping by plugging into one another and therefore creating a "puzzle"-style effect. The puzzle-style modular electronic device 100 can be a puzzle-style smartphone that includes a first plane 105 and a second plane 110. The second plane 110 includes a plurality of quadrants 120. The first and second planes 105, 110, along with the plurality of quadrants 120, are connected and communicate power and information via connection points 140. Connection points 140 can include quadrant interlocks, screen interlocks, and block module interlocks, each of which transfer data and power. The interlocks can be pluggable 'teeth,' magnet like structures, induction structures, or any re-attachable adhesive device which can achieve the desired functionality as described.

The first plane 105 can include an input/display device, such as a touchscreen that provides an electronic visual display along with information processing system for receiving touch and/or tactile. Each of the plurality of quadrants 120 receives block modules. A block module is a software programmable integrated circuit (also referred to as a chip, microchip, field programmable array, microprocessor) that includes a set of electronic circuits on one small plate ("chip") of semiconductor material. The plurality of quadrants 120 may include a processor and a memory, which stores computer instructions, for carrying our functional operations. Examples of modules include a global positioning system chip, a camera, a gyroscope, an accelerometer, a battery, a memory, a microphone, a speaker, etc.

The planes 105, 110 and the plurality of quadrants 120 enable block modules to be physically arranged in an assembly orientation that is used for authentication that selectively enables certain operations. For instance, assembly orientation can be a customer designed orientation that requires the block modules to be in a certain physical relation to each other to activate a particular function of the puzzle-style modular electronic device 100. Examples of assembly orientations include a square, a rectangle, a stacked orientation, a circle, a triangle, etc., or combination thereof.

Figure 2:
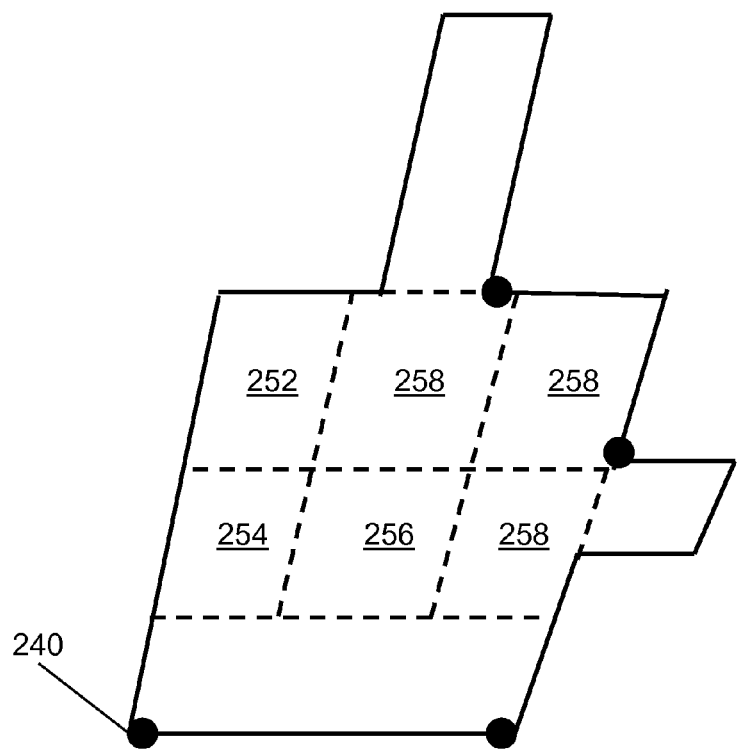
FIG. 2 depicts a quadrant of the puzzle-style modular electronic device according to an embodiment of the present invention.

Further, the physical interconnection and arrangement of the plurality of block modules can be utilized for authentication that selectively enables certain operations. That is, a customer can designate the block modules to be arranged on a single plane or within a quadrant in a square shape as shown in FIG. 2 below. Once arranged in the shape of the rectangle, the puzzle-style modular electronic device 100 will activate an operation associated with the square.

Turning to FIG. 2, a quadrant 220 of the puzzle-style modular electronic device 100 is shown according to an embodiment of the present invention. The quadrant 220 includes a function module 252, a power module 254, a location module 256, and a plurality of communication radio modules 258. In this way, each quadrant of the puzzle-style modular electronic device 100 can include one or more block modules that correspond to these various supplemental characteristics.

The function module 252 can include quadrant function-specific hardware, such as a projector, camera, a camera, a gyroscope, an accelerometer, a microphone, a speaker, etc. The power module 254 can include independent power source, such as a battery or inductive charging mechanism. The location module 256 can include independent position hardware, such as a global positioning system chip. Each communication radio module 258 can be a software programmable transceiver that can utilize any communication technology based on its programming.

In one embodiment, the puzzle-style modular electronic device 100 can redistribution of I/O to different ports (e.g., communication radio modules 258) if a particular module is taken offline. That is, the puzzle-style modular electronic device 100 can determine which communication radio modules 258 should receive network requests in a manner that efficiently use the available resources and maximizes the potential throughput of the puzzle-style modular electronic device 100.

In view of the above, the puzzle-style modular electronic device 100 can utilize a 'master' core that synchronizes resource usage of all available communication radio modules 258 and a credit system to organize I/O distribution. Note that the master core can be a block module, as described above, or a fixed piece of hardware within the puzzle-style modular electronic device 100. The master core presents a single virtual network pipe to a mobile operating system of the puzzle-style modular electronic device 100, abstracting away the presence of multiple hardware components (e.g., multiple block modules).

Figure 3:
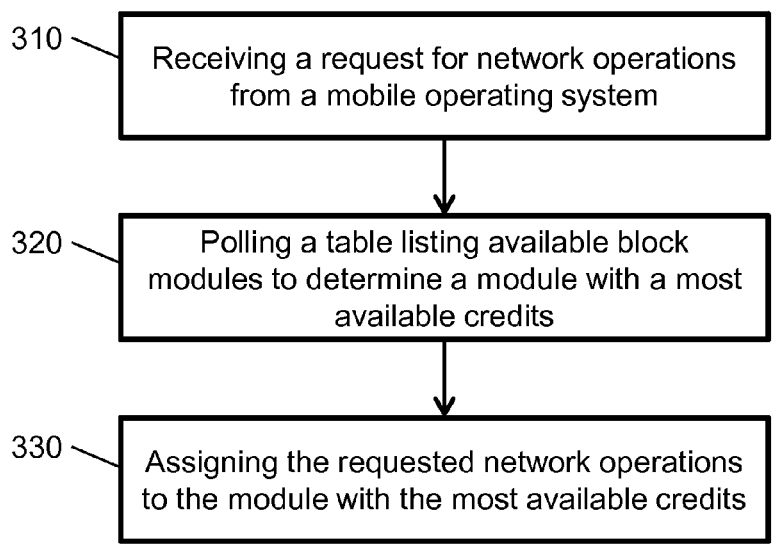
FIG. 3 depicts a process flow executed by a puzzle-style modular electronic device according to an embodiment of the present invention.

Turning now to FIG. 3, a process flow 300 executed by the master core of the puzzle-style modular electronic device 100 according to an embodiment of the present invention is illustrated. The process flow 300 begins at block 310, where the master core receives a request for network operations from the mobile operating system. It will be noted that the request for network operations can be in response to a send request from a device application or a send request from an external device to receive data on the puzzle-style modular electronic device 100. In response to the request, at block 320, the master core polls a table listing available block modules to determine a module with the most available credits. The master core is responsible for polling the available hardware sockets for new modules and bringing them online.

Next, at block 330, the master core assigns the requested network operations to the module with the most available credits. The master core is configured to track a table of operations that have been assigned to various modules, and in turn will re-assign network operations to an available block module should the block module originally assigned the workload be taken offline. The master core is also configured to provide an interface that permits the block modules to update the master core with changes to a respective number of available credits. A "credit" allows a sender to transfer data to a receiver, if the receiver can meet the SLA (Service Level Agreement requirements associated with bandwidth, capacity, latency (or response-time) or jitter of a communication transfer. As packets are transferred from the sender to the receiver, the receiver sends credits to the sender to enable forward progress of communication. "Credits" can be maintained for bandwidth capacity, latency, jitter, or any combination thereof.

The block modules are configured to provide the master core with information on how many credits they have available, and increasing/reducing the number available according to how much service level agreement capacity (also referred to as "capacity") they have remaining. It will be noted that service level agreement capacity covers bandwidth, latency, jitter, or any combination thereof. The algorithm by which block modules determine the number of credits is configurable based on design need. When a block module completes its network operations, the master core is then configured to route the data back to the operating system via the virtual hardware interface, thereby notifying the operating system of completed operations.

To further explain the operation of the puzzle-style modular electronic device 100, the following use-case is illustrated. The puzzle-style modular electronic device 100 can utilize a first block module on a first cell phone network of a first cell phone service provider. The puzzle-style modular electronic device 100 can also utilize a second block module on a second cell phone network of a second cell phone service provider. The signal strength of the first cell phone network is 30%. The signal strength of the second cell phone network is 10%. The master core of the puzzle-style modular electronic device 100 assigns a first set of data packet communications to the first block module from a first application and a second set of data packet communications to the second block from a second application. Thus, the aggregate network capacity across the cell phone network enables the puzzle-style modular electronic to drive up the performance of the communication (note that the bits per second associated with each network is additive).

Note that because multiple communication radios (the first and second block modules) are being used by the puzzle-style modular electronic device 100, when the set of data packet communications are sent and depending on the signal strength, the master core will have an understanding of how much bandwidth is available on both networks. Further, the multiple communication radios can also include logic (e.g., prioritization logic) where each radio can allow traffic designated by the master core to be carried through a respective network based on the available signal strength. In this way, packets are dynamically distributed in accordance with the signal strengths, which vary over time, to avoid extensive buffering by each of the multiple communication radios. Also, based on application prioritization, a single application could be switched across radios with higher signal strength to ensure forward progress for high priority applications.

Figure 4:
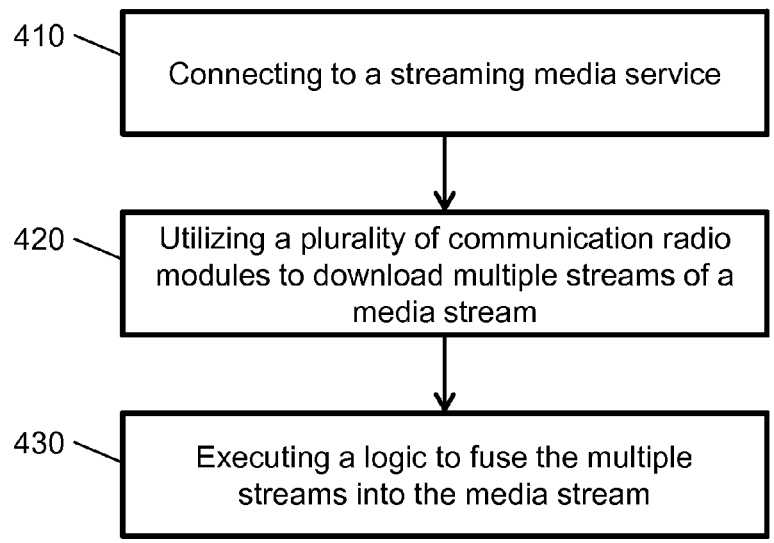
FIG. 4 depicts another process flow executed by a puzzle-style modular electronic device according to an embodiment of the present invention.

Turning now to FIG. 4, a process flow 400 executed by the puzzle-style modular electronic device 100 according to an embodiment of the present invention is illustrated. The process flow 400 relates to receiving communications through multiple block modules. The process flow 400 begins are block 410, where the puzzle-style modular electronic device 100 connects to a streaming media service utilizing a single designation (e.g., a single internet protocol address) to activate a media stream (e.g., a video) in a control plane. To preserve service level agreements and qualities of service with rapidly changing network service conditions across communication radios, each of the radios accesses the same video stream.

Then, at block 420, the puzzle-style modular electronic device 100 utilizes each of its communication radio modules 258 to download multiple streams of the media, where each stream of the media is an exact replica of the media stream requested for viewing. As a result, if one of the communication radios modules 258 encounter poor performance, then video frames from other radios may be used for display. Further, if video frame resolution across one radio is reduced, then frames from other radios may be used to create a frame of required resolution.

Next, in block 430, the master core executes logic to fuse the multiple streams into a single media stream. In an embodiment, the master core can continually supply new destination addresses (e.g., internet protocol addresses corresponding to different communication radio modules 258) to the streaming media service for transmission corresponding to changing network conditions. In another embodiment, the streaming media service can dynamically change the destination address if the current destination address sends flow-control (e.g. PAUSE) frames that exceed a pre-determined time-out. In this case, the puzzle-style modular electronic device 100 with distributed radios will register all its destination addresses with the streaming media service, which include, radio destination data plane address and control plane destination address for the master core. In another embodiment, mobile base stations can be utilized to proxy flow-control transmission control protocol/internet protocol or Ethernet messages on behalf of the destination communication radio modules 258.

Figure 5:
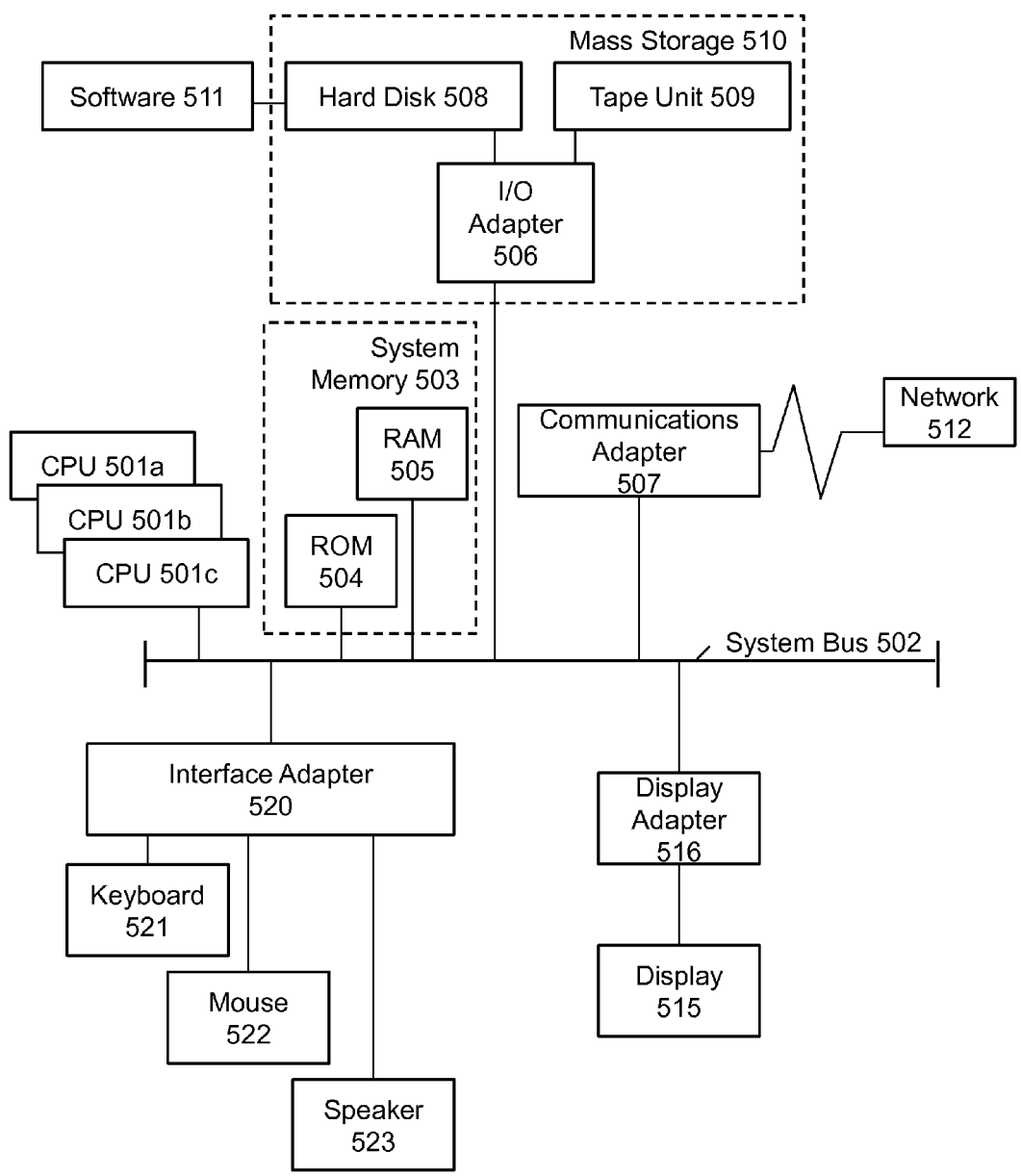
FIG. 5 depicts a processing system of a puzzle-style modular electronic device according to an embodiment of the present invention.

Referring now to FIG. 5, a puzzle-style modular electronic device 100 is shown as a processing system 500 embodiment for implementing the teachings herein. The processing system 500 can include a plurality of block modules, where each module corresponds to an hardware and/or software element of the processing system 500. In this embodiment, the processing system 500 has one or more central processing units (processors) 501a, 501b, 501c, etc. (collectively or generically referred to as processor(s) 501). The processors 501, also referred to as processing circuits, are coupled via a system bus 502 to system memory 503 and various other components. The system memory 503 can include read only memory (ROM) 504 and random access memory (RAM) 505. The ROM 504 is coupled to system bus 502 and may include a basic input/output system (BIOS), which controls certain basic functions of the processing system 500. RAM is read-write memory coupled to system bus 502 for use by processors 501.

FIG. 5 further depicts an input/output (I/O) adapter 506 and a network adapter 507 coupled to the system bus 502. I/O adapter 506 may be a small computer system interface (SCSI) adapter that communicates with a hard disk 508 and/or tape storage drive 509 or any other similar component. I/O adapter 506, hard disk 508, and tape storage drive 509 are collectively referred to herein as mass storage 510. Software 511 for execution on processing system 500 may be stored in mass storage 510. The mass storage 510 is an example of a tangible storage medium readable by the processors 501, where the software 511 is stored as instructions for execution by the processors 501 to perform a method, such as the process flows of FIGS. 3-4. Network adapter 507 interconnects system bus 502 with an outside network 512 enabling processing system 500 to communicate with other such systems. A screen (e.g., a display monitor) 515 is connected to system bus 502 by display adapter 516, which may include a graphics controller to improve the performance of graphics intensive applications and a video controller. In one embodiment, adapters 506, 507, and 516 may be connected to one or more I/O buses that are connected to system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 502 via an interface adapter 520 and the display adapter 516. A keyboard 521, mouse 522, and speaker 523 can be interconnected to system bus 502 via interface adapter 520, which may include, for example, a Super I/O chip integrating multiple device adapters into a single integrated circuit.

Thus, as configured in FIG. 5, processing system 505 includes processing capability in the form of processors 501, and, storage capability including system memory 503 and mass storage 510, input means such as keyboard 521 and mouse 522, and output capability including speaker 523 and display 515. In one embodiment, a portion of system memory 503 and mass storage 510 collectively store an operating system, such as the z/OS or AIX operating system from IBM Corporation, to coordinate the functions of the various components shown in FIG. 5.

The technical effects and benefits of embodiments of the puzzle-style modular electronic device 100 include improving upon contemporary systems by adapting to changing hardware resources without the need for user interaction and handling a reduction in capacity cleanly without a major interruption in normal operation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for maximizing communication performance of a modular electronic device including a master core and a plurality of communication radio modules, comprising:
   receiving, by the master core, a request for network operations from a mobile operating system of the modular electronic device;
   polling, by the master core, a table to determine a capacity of each of the plurality of communication radio modules; and
   assigning, by the master core, the network operations to a module of the communication radio modules with a highest available capacity to maximize the communication performance of the modular electronic device,
   wherein each of the plurality of communication radio modules is a software programmable transceiver that includes a processor and a memory configured to utilize any communication technology based on instructions stored in the memory, and
   wherein the modular electronic device is a puzzle-style smartphone comprising a plane of interlocking quadrants, each of the interlocking quadrants configured to receive one or more of the plurality of communication radio modules.

2. The method of claim 1, wherein the assigning of the network operation further comprises:
   dynamically distributing the network operations across all of the plurality of communication radio modules based on the table.

3. The method of claim 1, wherein the master core is configured to re-assign the network operations to an available communication radio if the module with the highest available capacity goes offline.

4. The method of claim 1, wherein the master core is configured to track a table of network operations that have been assigned to the plurality of communication radio modules.

5. The method of claim 1, wherein a physical location of at least one of the plurality of communication radio modules is different from a physical location of the master core.

6. The method of claim 1, wherein the puzzle-style smartphone comprising a backplane for receiving the plane of interlocking quadrants.

\* \* \* \* \*